United States Patent [19]

Dietz et al.

[11] Patent Number: 5,210,905
[45] Date of Patent: May 18, 1993

[54] PIVOT CONTROL FOR HAND GRIP USEFUL FOR VEHICLES

[75] Inventors: Gunter Dietz, Wuppertal; Klaus P. Kaiser, Wermelskirchen, both of Fed. Rep. of Germany

[73] Assignee: Gebr. Happich GmbH, Fed. Rep. of Germany

[21] Appl. No.: 854,300

[22] Filed: Mar. 19, 1992

[30] Foreign Application Priority Data

Apr. 4, 1991 [DE] Fed. Rep. of Germany ....... 4110822

[51] Int. Cl.⁵ .............................................. E05B 3/00
[52] U.S. Cl. ....................................... 16/124; 16/1 R; 16/DIG. 7; 16/115; 292/336.3
[58] Field of Search ...................... 16/1 R, 110 R, 115, 16/124, 125, DIG. 7; 292/DIG. 23, DIG. 30, DIG. 31, 336.3

[56] References Cited

U.S. PATENT DOCUMENTS

| | | | |
|---|---|---|---|
| 3,634,907 | 1/1972 | Watt, Jr. ........................ | 16/DIG. 6 |
| 4,343,501 | 8/1982 | Meeks .............................. | 292/336.3 |
| 4,475,415 | 10/1984 | Yamamoto ....................... | 292/336.3 |
| 4,497,514 | 2/1985 | Moriya et al. ................... | 292/336.3 |
| 4,653,143 | 3/1987 | Ketelhut et al. ................. | 16/124 |

FOREIGN PATENT DOCUMENTS

3513293A1 4/1985 Fed. Rep. of Germany.
3828032A1 8/1988 Fed. Rep. of Germany.

Primary Examiner—W. Donald Bray
Attorney, Agent, or Firm—Ostrolenk, Faber, Gerb & Soffen

[57] ABSTRACT

A hand grip for pivotal attachment to a surface of a body, as on a vehicle. The hand grip has a U-shaped grip body with a web joining two arms. The free end of each arm is attached on a bearing pin. The bearing pin is swingably mounted on a bearing bracket so that the grip pivots around the axis of the bearing pin with respect to the bracket. A torsion spring normally returns the grip to a position of non-use. To prevent excessive impact and resulting noise upon the return movement, a friction brake, consisting of a molding of a wear resistant viscoelastic plastic material, has a bore which receives an axial region of the bearing pin. The bore diameter is smaller than that of the bearing pin or least is of a size that permits relative movement between the molding and the bearing pin while braking the movement of the bearing pin with respect to the bracket, for slowing the return of the grip to the non-use position.

9 Claims, 1 Drawing Sheet

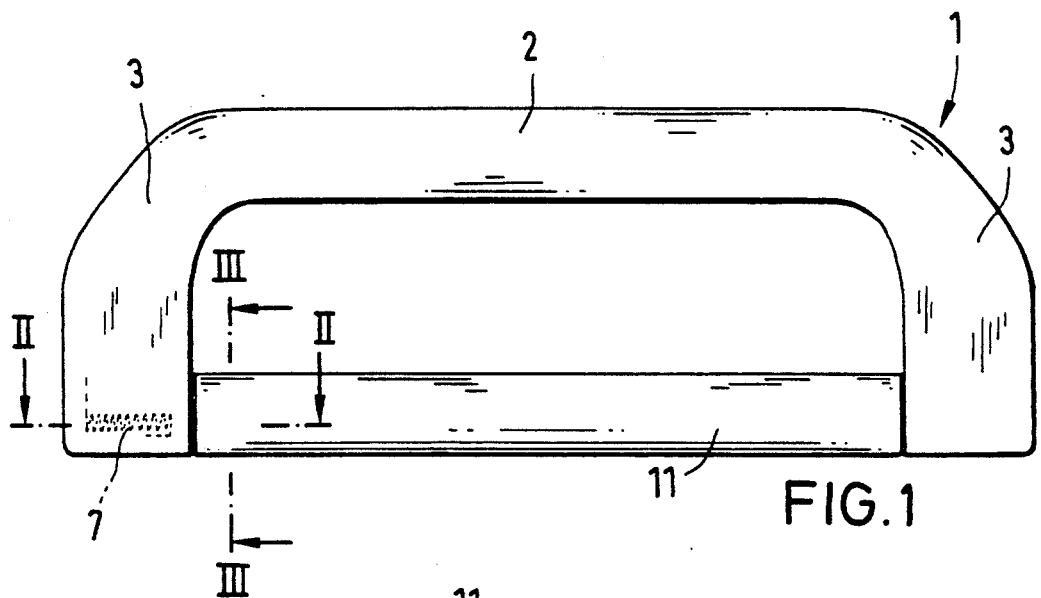
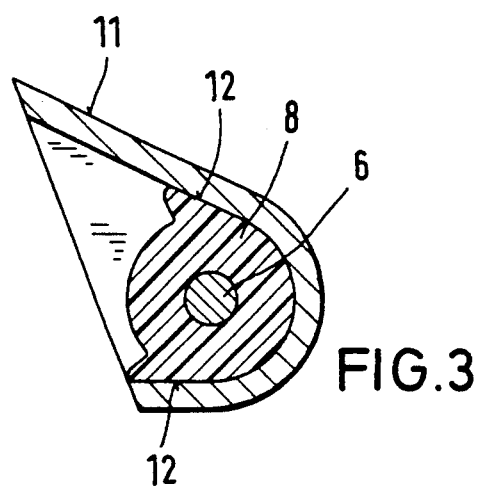
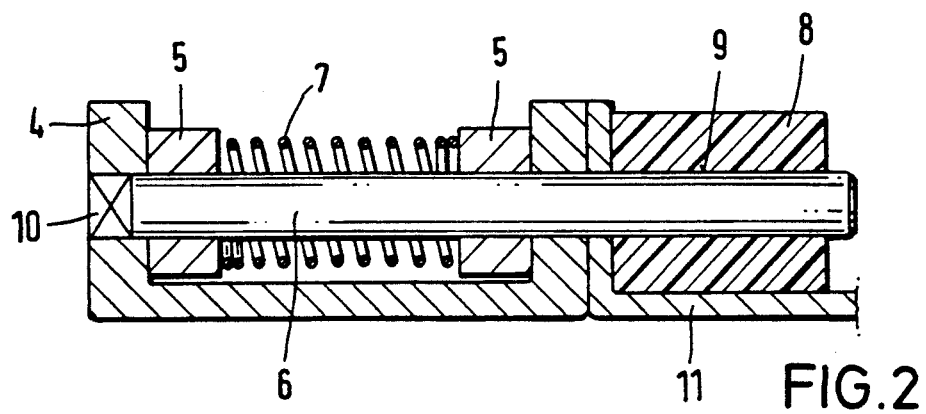

PIVOT CONTROL FOR HAND GRIP USEFUL FOR VEHICLES

BACKGROUND OF THE INVENTION

The present invention relates to a hand grip useful for vehicles, although such an application of the hand grip is not required, and particularly relates to a control of the return pivoting of the hand grip to a non-use position.

A hand grip typically comprises a grip body of U-shape, having a web and two arms. For the hand grip to be pivotable on a car body or another installation, stationary bearing brackets attached to the car body are pivoted to the free ends of the arms by bearing pins attached to the grip body arms. The brackets are adapted to be fastened to the car body usually in the transition region between the roof and a side wall. The grip body is swingable from a position of non-use, where it rests closely against an attachment surface, against the force of a restoring spring, and into a position of use protruding from the attachment surface. Means are provided to prevent sudden movements upon the restoring or return movement of the grip body after the user has released the grip.

In German Published Application OS 35 13 293 from which the present invention proceeds, a hydraulic vane shock absorber is provided for this type of holding grip in order to prevent its sudden movement upon the return motion of the grip body. That known hand grip was not capable of development up to the stage of mass production. It was found that the vane shock absorber could not satisfy technical requirements. On the one hand, the known device proved to be too expensive to manufacture and mount. On the other hand, it was also subject to malfunction in actual use. Thus, up to now a hand grip which does not cause impact noise upon the restoring movement, like the noise occurring on the closing of a mousetrap, is not available.

German Published Application OS 38 28 032 A1 also describes a hand grip in which the movement to the position of non-use is damped by a pinion which acts as a friction brake. However, a liquid of high viscosity or mere friction is suggested as means of producing friction. A brake on the bearing pin of an arm of the grip is not suggested.

SUMMARY OF THE INVENTION

Proceeding from the above type of hand grip, the object of the invention is to avoid disagreeable impact noise upon return movement of the grip body and for this purpose to provide means which is neither expensive to manufacture nor to mount nor is subject to malfunction in use.

The grip has a body comprised of a web which joins two arms which are pivoted to the car body or another installation in which the grip is disposed. Bearing pins in the arms are received in brackets on the body and the bearing pins rotate in the brackets. A torsion spring returns the grip to its original non-use position when the grip has been lifted.

In the invention, in order to decelerate the return movement of the grip the hand grip is provided with at least one friction brake. That brake comprises a molded body of wear resistant, viscoelastic plastic material which is attached stationary to the vehicle body. Although the whole brake body is of molded plastic for practical manufacturing reasons, only its portion at the below described bore hole should be that molded material and the remainder of the brake body may be of any material. The molded body has a bore hole in it to receive an axial region of one of the bearing pins on one of the arms of the grip. The bearing pin is fixed to an arm of the grip and pivots along with that arm and the grip. The diameter of the bore in the molded body may be smaller than the diameter of the bearing pin to assure frictional braking between the pin and the molded body. But, the bore is large enough to permit relative movement between the molded body and the bearing pin.

A friction brake formed from a plastic molding can, of course, be manufactured in a relatively simple and economical manner, even if high grade wear resistant material is used. Such a friction brake has the further essential advantage that it can operate for a long time without maintenance or breakdown. Its mounting presents no problem, since it is merely necessary for this purpose to plug the bearing pin of the grip arm into the bore of the plastic molding in the manner of a press fit. The braking force acts continuously and at all times uniformly. As a result, it can rapidly and easily be determined by a few tests how much smaller to make the hole in the brake molding than the diameter of the pin. By mere adaptation of the diameters of the hole and pin to each other, a match which corresponds to the specific use application and the other elements of the grip can be obtained. No change is required in the grip arm non-use position restoring spring which is customarily used, since the spring force is, in any event, selected to be greater than necessary in order to assure the return movement of the grip even in the case of relatively large tolerances. This functionally induced greater spring force in the past frequently produced loud impact noises which are avoided by the invention.

A wear resistant plastic having, for instance, rubber-like properties is suitable for the manufacture of the molding. Tests carried out by the assignee hereof with TPE (thermoplastic polyester elastomer) have given excellent results, even in long term tests. For example, one material, which has been tested successfully, is named "Hytrel" and is sold by DuPont.

The plastic molding is preferably arranged fixed against twisting on one of the bearing brackets or on a profiled rail connecting the molding and that bracket together. The bearing pin which cooperates with the molding is seated, fixed against turning, on the grip and rotates with the grip. However, in this connection, it is merely necessary for the bearing pin to be able to turn within the molding or for the molding to be able to turn around the bearing pin.

In one embodiment of the invention, the bearing pin which cooperates with a molded body has a smooth corrosion protected surface. This enables the same constant braking action to be obtained over the entire useful life of the hand grip. The bearing pins can, for instance, be comprised of stainless steel or else can be covered, for instance, with a layer of chromium, or the like.

Other objects, features and advantages of the present invention will become apparent from the following description of the invention which refers to the accompanying drawings.

BRIEF DESCRIPTION OF THE DRAWINGS

FIG. 1 is a view of a hand grip;
FIG. 2 is a section along the line II—II of FIG. 1; and
FIG. 3 is a section along the line III—III of FIG. 1.

DESCRIPTION OF A PREFERRED EMBODIMENT

The hand grip of the invention has a body comprising a U-shaped grip yoke 1 having a web 2 and two arms 3 joined by the web. There are two bearing brackets 5, but only the left side bracket is shown in FIG. 2. The bracket is pivotally connected through a bearing pin 6 to the free arm end 4 of the arm 3. The bearing brackets are adapted to be fastened in a customary manner, not shown in detail, to a car body, not shown. The grip yoke 1 is held in a position of non-use, or is moved back into the position of non-use from the position of use, by means of a return torsion spring 7, which is a coil spring connected between the arm end 4 and the bracket 5. The spring is coiled tighter and tensioned when the arm is raised to a position of use.

In order that the return movement of the grip not terminate in a loud impact noise, the hand grip of the invention includes a friction brake. It is comprised of a molding 8 of wear resistant, viscoelastic plastic and preferably TPE or thermoplastic polyester elastomer. The molding 8 has an axial hole 9 through it to receive an axial region of the bearing pin 6. The cross section or diameter of the hole 9 is smaller than the cross section or diameter of the bearing pin 6 so that the bearing pin 6 is seated in the hole 9 in the manner of a force fit. This force fit is selected so that relative movement between the molding 8 and the bearing pin 6 is still possible. In other words, the frictional force of the molding 9 on the bearing pin is, on the one hand, so slight that the return spring 7 can move the grip yoke back into the position of non-use but, on the other hand, is great enough to slow return motion of the grip so that loud impact noises should not occur.

In the embodiment shown, the bearing pin 6 is fixed and secured against turning on the grip yoke 1 by a form locked attachment 10, while the molding 8 is seated, fixed against turning, in a bearing bracket 5 or in a profiled rail 11 which connects the bearing brackets 5 located at the opposite ends of the grip to each other. In FIG. 3, the molding 8 is of non-circular cross section and through stop surfaces 12, the molding rests against corresponding mating surfaces of the profiled rail.

Swinging the grip yoke 1 from the position of non-use shown in FIG. 1 into the position of use pivots the arm 4 and the bearing pin 6 against the torsion force of the return spring 7 on the arm 4 and against the friction force exerted by the molding 8 on the turning pin 6. These resisting forces are easily overcome by the user's hand due to the existing lever ratios. After the user releases the grip yoke I, the yoke tries to return to its position of non-use, as a result of the force exerted by the return spring. This movement takes place in decelerated fashion, as compared with the prior art, due to the molding 8 seated in friction locked manner on the rotatable bearing pin 6. The final speed of the grip yoke before it strikes against its stop surface is very slight and there is no hard striking blow, with the corresponding undesired development of noise.

In each individual case, it must be determined whether only one or both bearing pins 6 are to be provided with a molding 8. Further, this solution to the undesired banging can be successfully transferred also to other vehicle equipment parts or other non-vehicle applications having a grip with swingable mounting.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A pivotable hand grip for pivotable connection to a body, with return movement of the hand grip being braked, the hand grip comprising:

the grip comprising a grippable web and two spaced apart arms which are connected to the web and are moveable with the web, each arm having a free end away from the web, a bearing pin connected with the arm free end for moving with the arm free end as the grip is pivoted around the bearing pins as a pivot;

a bracket fastenable to the body, and the bearing pin also being connected with the bracket to pivot around the axis of the bearing pin with respect to the bracket as the grip is pivoted with the bearing pin around the axis of the bearing pin;

a return spring connected with the grip to bias the grip to return to a position of non-use when the grip arm is pivoted around the bearing pin to a position of use and the return spring being positioned to be tensioned as the grip is pivoted to the position of use;

a friction brake for preventing sudden movement of the grip to the position of non-use under the bias of the return spring by decelerating the turning movement of the grip, the brake comprising a molding of wear resistant material having a bore defined in it at a position to receive and the bore receiving an axial region of the bearing pin, the axial region of the bearing pin and the bore in the wear resistant molding being of respective diameters as to enable the bearing pin and the grip with it to pivot with respect to the molding while decelerating the return movement of the grip under the bias of the spring to prevent the grip from banging the body to which the bracket is attached as the grip returns to the position of non-use.

2. The hand grip of claim 1, wherein the molding is comprised of wear resistant, viscoelastic plastic material at least at the bore.

3. The hand grip of claim 2, wherein the molding at least at the bore consists of a thermoplastic polyester elastomer.

4. The hand grip of claim 2, wherein the diameter of the bore is narrower than the diameter of the axial region of the bearing pin while the diameters of the bore and axial region of the pin are near enough as to permit the axial region of the pin to be restrained by the plastic material at the bore yet be moveable to rotate in the bore.

5. The hand grip of claim 1, wherein the bracket is on the body and the brake is attached on the bracket and the bearing pin rotates with respect to the bracket.

6. The hand grip of claim 5, wherein there is a respective one of the bearing pins for each of the arms of the grip and there is a respective bracket for each of the bearing pins and each of the bearing pins extends into the respective bore of the respective bracket.

7. The hand grip of claim 6, further comprising a profile rail which connects the bearing brackets together.

8. The hand grip of claim 6, wherein there is respective brake comprising a respective molding on each of the brackets for each of the bearing pins.

9. The hand grip of claim 6, wherein each of the bearing pins, at least in the axial region thereof, has a smooth surface which is of a material protected from corrosion.

* * * * *